(12) United States Patent
Verbridge et al.

(10) Patent No.: US 12,228,203 B2
(45) Date of Patent: Feb. 18, 2025

(54) POSITION-BASED LUBRICATION CONTROL STRATEGY FOR DISCONNECT DIFFERENTIAL

(71) Applicant: Rivian IP Holdings, LLC, Irvine, CA (US)

(72) Inventors: Mason Verbridge, Canton, MI (US); Vinaey Kalyanaraman, Rancho Palos Verdes, CA (US); Gary Allen Pinkley, Northville, MI (US); George Zalanca, Windsor (CA)

(73) Assignee: Rivian IP Holdings, LLC, Irvine, CA (US)

( * ) Notice: Subject to any disclaimer, the term of this patent is extended or adjusted under 35 U.S.C. 154(b) by 76 days.

(21) Appl. No.: 17/840,298

(22) Filed: Jun. 14, 2022

(65) Prior Publication Data

US 2023/0008955 A1 Jan. 12, 2023

Related U.S. Application Data

(60) Provisional application No. 63/220,417, filed on Jul. 9, 2021.

(51) Int. Cl.
*F16H 57/04* (2010.01)
*F16H 48/40* (2012.01)

(52) U.S. Cl.
CPC ......... *F16H 57/0483* (2013.01); *F16H 48/40* (2013.01); *F16H 57/0424* (2013.01); *F16H 57/046* (2013.01)

(58) Field of Classification Search
CPC .. F16H 57/0483; F16H 48/40; F16H 57/0424; F16H 57/046; B60K 7/0007;
(Continued)

(56) References Cited

U.S. PATENT DOCUMENTS 3,741,343 A * 6/1973 Lindenfeld ......... F16H 57/0427
  184/6.12
4,263,824 A * 4/1981 Mueller ............... F16H 57/0483
  475/86
(Continued)

FOREIGN PATENT DOCUMENTS

DE 102014215449 A1 2/2016
DE 102016209738 A1 12/2016
(Continued)

OTHER PUBLICATIONS

Office Action dated Aug. 15, 2023 of Japanese Patent Application No. 2022-110709 with English Machine Translated by Google.

*Primary Examiner* — Colby M Hansen
(74) *Attorney, Agent, or Firm* — Haley Guiliano LLP; James A. Leiz

(57) ABSTRACT

Example illustrations are directed to a differential, e.g., a disconnecting differential, and associated methods. A disconnecting differential may include two side gears configured to deliver torque from an output gear or differential casing to respective vehicle wheels when the differential is in a connected state. Each of the side gears may be configured to receive the torque from the output gear while permitting a differential speed between the side gears. The disconnecting differential may also include a disconnect device configured to disconnect the output gear from the two side gears such that the differential is in a disconnected state. The disconnecting differential may also include a position sensor configured to determine a rotational position of the output gear.

20 Claims, 6 Drawing Sheets

(58) Field of Classification Search
CPC ..... B60K 17/02; B60K 17/165; B60W 50/08; B60L 15/2054
USPC ........................................................ 475/160
See application file for complete search history.

(56) References Cited

U.S. PATENT DOCUMENTS

| | | | | |
|---|---|---|---|---|
| 5,157,966 | A * | 10/1992 | Lugosi | ..................... G01P 3/443 |
| | | | | 73/115.02 |
| 6,203,464 | B1 * | 3/2001 | Ishikawa | ................. F16H 59/38 |
| | | | | 475/230 |
| 8,512,193 | B1 | 8/2013 | Hilker et al. | |
| 8,746,405 | B2 | 6/2014 | Perakes et al. | |
| 8,858,381 | B2 | 10/2014 | Trost | |
| 11,732,796 | B1 * | 8/2023 | Wainright | ........... F16H 57/0427 |
| | | | | 475/160 |
| 11,746,885 | B2 * | 9/2023 | Kagami | ................ F16H 57/043 |
| | | | | 475/160 |
| 2008/0196975 | A1 * | 8/2008 | Fujita | .................. F16H 57/0427 |
| | | | | 184/6.12 |
| 2012/0295751 | A1 * | 11/2012 | Okada | ................. F16H 57/0483 |
| | | | | 475/160 |
| 2013/0001018 | A1 * | 1/2013 | Masuda | .............. F16H 57/0483 |
| | | | | 184/6.12 |
| 2017/0276232 | A1 * | 9/2017 | Hayes | ................. F16H 57/0457 |
| 2019/0055997 | A1 | 2/2019 | Inose | |
| 2021/0172506 | A1 | 6/2021 | Swinger | |

FOREIGN PATENT DOCUMENTS

| | | |
|---|---|---|
| DE | 102019105053 A1 | 9/2020 |
| GB | 0624970 A | 6/1949 |
| JP | 09-286254 A | 11/1997 |
| JP | 2017-515065 A | 6/2017 |
| JP | 2019-086084 A | 6/2019 |
| WO | 2020/200641 A1 | 10/2020 |

* cited by examiner

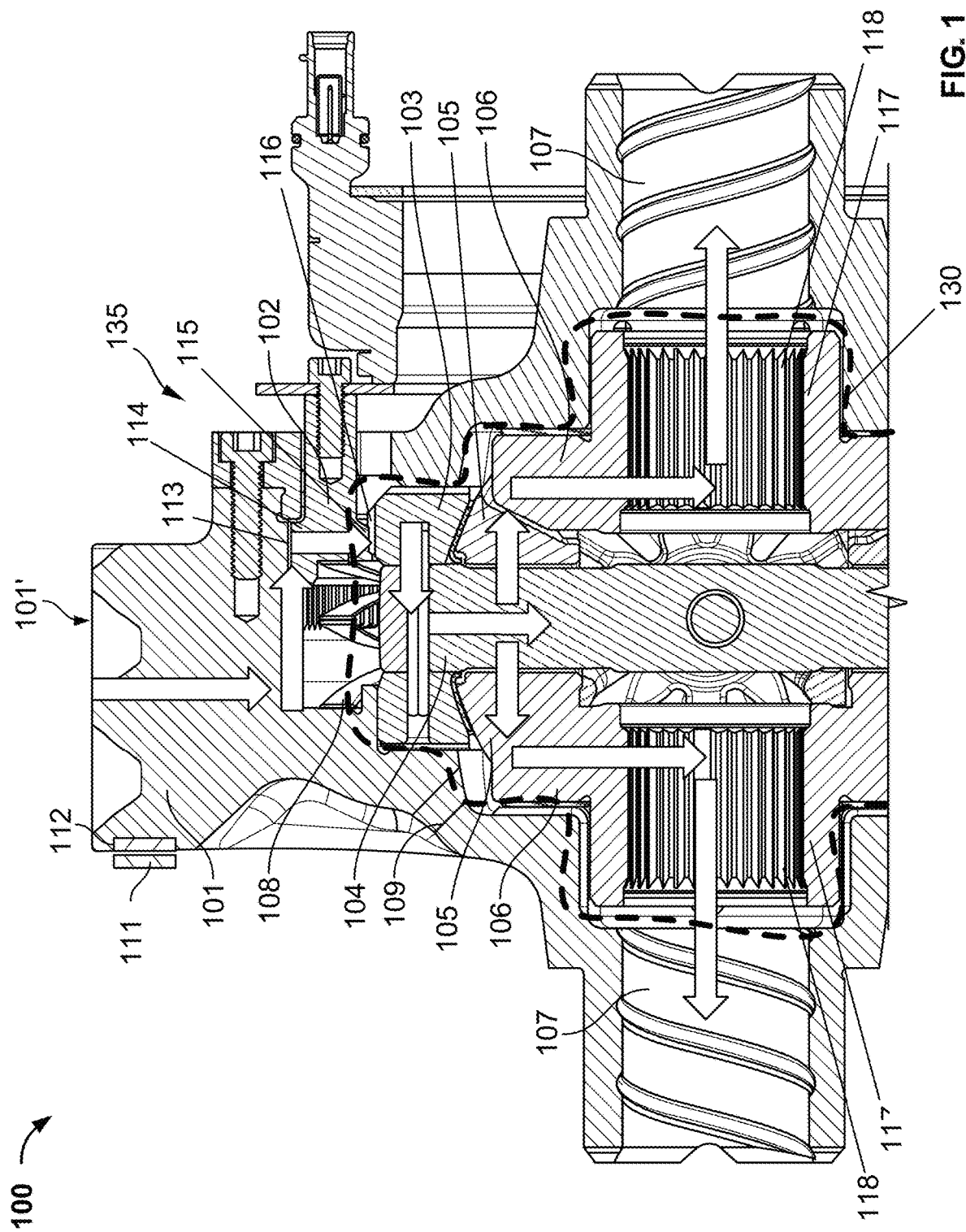

POSITION-BASED LUBRICATION CONTROL STRATEGY FOR DISCONNECT DIFFERENTIAL

CROSS-REFERENCE TO RELATED APPLICATION

This application claims priority to U.S. Provisional Patent Application No. 63/220,417, filed on Jul. 9, 2021, the contents of which are hereby expressly incorporated by reference in their entirety.

INTRODUCTION

The present disclosure is directed to a differential, and more particularly to a disconnecting differential.

SUMMARY

In at least some example illustrations, a disconnecting differential includes two side gears configured to deliver torque from an output gear to respective vehicle wheels when the differential is in a connected state. Each of the side gears are configured to receive the torque from the output gear while permitting a differential speed between the side gears. The disconnecting differential also includes a disconnect device configured to disconnect the output gear from the two side gears such that the differential is in a disconnected state. The disconnecting differential also includes a position sensor configured to determine a rotational position of the output gear.

In at least some example approaches, the output gear is configured to be rotated while the differential is in the disconnected state.

The output gear may, in at least some examples, be configured to be rotated while the differential is in the disconnected state in response to the determined rotational position of the output gear differential casing.

In at least some examples, a differential casing rotating with the output gear includes a casing aperture configured to be aligned with an oil jet configured to provide lubrication to moving internal components of the differential via the casing aperture, wherein the oil jet is not obstructed by the casing when the casing aperture is aligned with the oil jet.

In at least some examples, a differential casing rotating with the output gear includes a casing aperture configured to permit lubrication of moving internal components of the differential by an oil jet, wherein the output gear is configured to be rotated in response to the determination that the casing aperture is misaligned with the oil jet.

In at least some examples, the disconnecting differential includes a marker secured to the output gear, with the position sensor being configured to determine the rotational position of the output gear based upon a proximity of the marker to the position sensor.

In at least some example approaches, a differential casing rotating with the output gear comprises a lubrication aperture configured to allow an oil jet to deliver a lubricant to an internal region of the disconnecting differential.

In at least some examples, the disconnect device includes a shifting collar configured to engage an external spline with an internal spline when the disconnecting differential is in a connected state. In these approaches, the differential may also include a spring biasing the shifting collar toward an engaged position, wherein the disconnecting differential is in the connected state.

In at least some examples, the differential includes a controller in communication with the sensor.

In at least some example approaches, a vehicle is provided that comprises a disconnecting differential having two side gears configured to deliver torque from a differential casing to respective vehicle wheels when the differential is in a connected state. Each of the side gears may be configured to receive the torque from the differential casing while permitting a differential speed between the side gears. The vehicle may also include a disconnect device configured to disconnect the output gear from the two side gears such that the differential is in a disconnected state. The vehicle may further include a position sensor configured to determine a rotational position of the output gear.

In at least some examples, the vehicle also includes controller in communication with the sensor. The controller is configured to rotate the differential casing when the differential is in the disconnected state in response to the determined rotational position of the output gear.

In another example illustration, a method includes operating a differential in a connected state, wherein torque received from a motor is transmitted via a differential casing to a pair of axle shafts. The differential casing at least partially defines a lubrication enclosure, wherein the torque is transmitted from the differential casing to the axle shafts via two side gears configured to receive the torque from the differential casing while permitting a differential speed between the side gears. The method further includes disconnecting the side gears from the casing via a disconnect device such that the differential is in a disconnected state. In the disconnected state, the casing is not driven by the two side gears while the side gears are rotated by their respective vehicle wheel. The method also includes sensing a rotational position of the casing.

In at least some example approaches, a method also includes rotating the casing while the differential is in the disconnected state.

In some examples, a method also includes rotating the casing while the differential is in the disconnected state in response to the sensed rotational position of the casing.

In some examples, a method also includes aligning a casing aperture with an oil jet configured to provide lubrication to the moving internal components via the casing aperture. In some of these examples, the oil jet is not obstructed by the casing when the casing aperture is aligned with the oil jet.

Some examples may also include determining that a casing aperture defined by the casing is misaligned with an oil jet configured to provide lubrication to the moving internal components through the casing aperture. In these examples, the casing is rotated in response to the determination that the casing aperture is misaligned with the oil jet.

In some example methods, the rotational position of the casing is determined via a marker secured to the casing. In some of these examples, the rotational position of the differential casing is determined based on a proximity of the marker to the position sensor.

In some example methods, the differential casing at least partially encloses the two side gears.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 1 shows a cutaway view of an illustrative disconnecting differential, in accordance with some embodiments of the present disclosure;

DETAILED DESCRIPTION

Figure 2A:
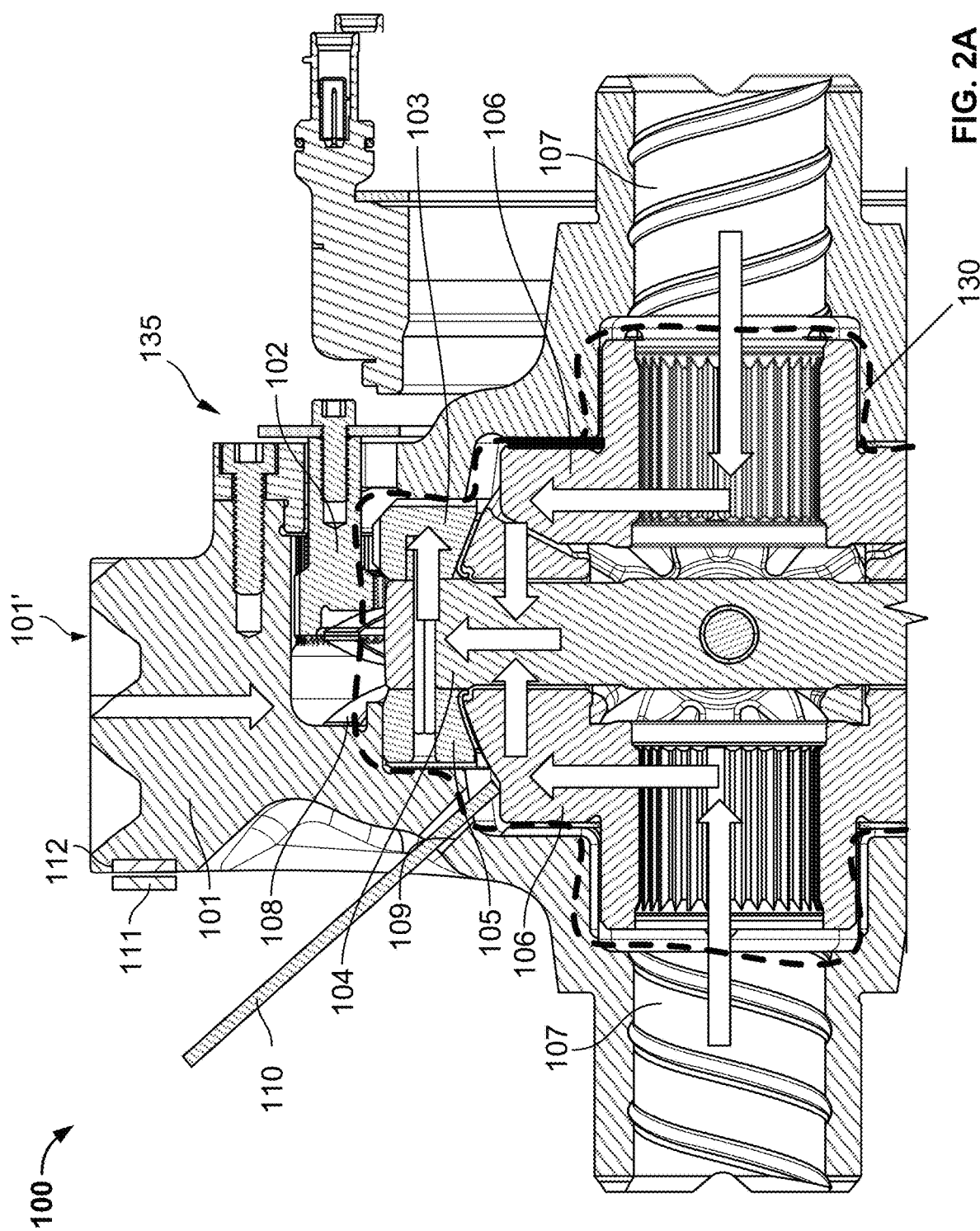
FIG. 2A shows a cutaway view of the disconnecting differential of FIG. 1 in a disconnected state with an aperture in a casing of the differential aligned with an oil jet, in accordance with some embodiments of the present disclosure.

In an all-wheel-drive vehicle, under constant vehicle speed conditions, power to one of the axles can be disconnected to improve propulsion system efficiency. While this may be true for all types of vehicles, disconnecting an axle may be particularly useful in the context of an electric vehicle, in which range of the vehicle may be relatively more important. In the case of a vehicle propulsion system with a single-motor e-axle, i.e., where an electric motor is driving a pair of wheels on a single axle, when disconnection of the axle is desired the motor can be disconnected through a use of a differential with a disconnect mechanism. In some examples, the output gear may be disengaged from internal components of the differential. Accordingly, the motor and output gear of the axle may be slowed or stopped, while internal components of the differential are spun by the wheels of the axle. The moving internal components of the differential generally require lubrication in the disconnected state, whereas the output gear/casing remains stationary. Generally, a lubrication level is maintained within the differential to ensure adequate lubrication. A compromise must typically be struck between lubrication and driveline efficiency. More specifically, to the extent a higher lubrication level is maintained within the differential, moving internal components of the differential are relatively more lubricated, but driveline efficiency is reduced. That is, a greater level of lubrication within the differential necessarily entails higher drag upon the moving internal components of the differential which is applied to the wheels of the axle.

The solutions described in detail herein generally increase the degree to which moving internal components of a differential are lubricated by a given amount of lubrication. Accordingly, lubrication levels may generally be reduced relative to previous approaches, thereby increasing driveline efficiency of the axle while ensuring adequate lubrication of moving components of the differential while in a disconnected state. Power loss associated with the axle may accordingly be reduced relative to previous approaches.

Generally, example approaches herein may employ a position sensor which can determine the tangential or rotational position of a differential casing. The casing may be provided with a casing aperture, which allows an oil jet to supply lubricant from outside the casing to moving components of the differential inside the casing. The position sensor may allow the casing aperture to be aligned with the oil jet, which has a stationary rotational position relative to the differential. For example, the motor may be used to turn the casing to bring the casing aperture into alignment with the location of the oil jet, permitting the oil jet to reach the moving internal components of the differential when the driveline is in a disconnected state.

Example position sensors may be any that is capable of monitoring the tangential position of the differential casing or output gear (to the extent the output gear is fixed to the differential casing). Merely by way of examples, an incremental encoder, a Hall effect sensor, a resolver, or the like may be employed. In some examples, position of the differential casing may be monitored or sensed via a connected rotating component having a rotational position can be expressed as a function of the output gear's position. Merely as one example, a resolver of a motor connected to the casing may measure angular position of a motor rotor, and thereby determine angular position of the differential casing. The position sensor may continuously monitor position of the casing aperture, at least relative to the oil jet. Once a signal to disengage is received, a control logic may use the position sensor or encoder to ensure alignment of the casing aperture and the oil jet, with the speed of output gear being zero. To the extent the casing aperture is misaligned with the oil jet, the motor associated with the axle may be used to rotate the casing to the extent needed to align the casing aperture with the oil jet.

Turning now to FIGS. 1, 2A, 2B, and 3, an example differential assembly 100 is illustrated. Referring initially to FIG. 1, the differential assembly 100 generally includes a differential casing 101, which includes an output gear 101' or ring gear structure fixed for rotation with the casing 101. Merely by way of example, the output gear 101' may be secured to an outer surface of the casing 101, or formed in an outer surface of the casing 101. The output/ring gear 101' may be driven by a pinion gear (not shown in FIG. 1) which is driven by a vehicle powertrain, e.g., an electric motor or the like. The output gear 101' and casing 101 may be encased in an outer housing (not shown in FIG. 1). The casing 101 generally provides an enclosure 130 for a plurality of interfacing components that are part of differential assembly 100. For example, the interfacing components may include at least a spindle 104 that is rotatably supported in the casing 101 at opposing ends thereof. As will be discussed further below, the spindle 104 may be selectively disconnected from the casing 101, such that the spindle 104 may rotate freely with respect to the casing 101. The spindle 104 turns a pair of side gears 106 by way of differential gears 105 at the ends of the spindle 104. The side gears 106 each drive respective axle shafts or side shafts 107. The pinion gear may be positioned to translate rotational motion from a powertrain, e.g., an electric motor, transmission, or the like to the casing 101. The side gears 106 may ultimately drive the axle shafts 107 in response to the driving of the output gear 101'/casing 101, while permitting relative differences in speed between the two axle shafts 107, as may be needed for a vehicle turning or otherwise when different speeds of wheels corresponding to the axle shafts 107, respectively, are needed.

In FIG. 1, the differential 100 is illustrated in a connected state, i.e., where the output gear 101'/casing 101 may transmit torque from a motor (not shown) to the axle shafts 107. In this connected state, torque flows from the motor to the axle shafts 107 from the casing 101 as indicated by the arrows in FIG. 1, and now described in further detail. The differential 100 may have a disconnect device 135, e.g., that is generally configured to selectively engage and disengage torque transmission from the output gear 101' to the axle shafts 107. In the example illustrated, the disconnect device includes a laterally shifting collar 102, which shifts in a lateral direction with respect to the output gear 101' and/or in a direction parallel to an axis of rotation of the output gear 101'. The output gear 101' may have an internal spline 113 which is engaged with an external spline 114 of the laterally shifting collar 102. The shifting collar 102 may define an internal spline 115 that may be enmeshed with an external spline 116 of a gear nest 103. The gear nest 103 may include a bore that surrounds the spindle 104. The spindle 104 may turn the side gears 106 by way of differential gears 105 disposed at either ends of the spindle 104. The side gears 106 may have an internal spline 117 that is enmeshed with an external spline 118 of the axle shafts 107. Accordingly, torque may be transmitted from the casing 101 to the axle shafts 107, allowing the motor (not shown) to provide power to wheels (not shown) associated with the axle shafts 107.

The differential 100 may be an open differential, i.e., such that a differential speed is permitted between the side gears 106, resulting in rotation of the differential gears 105. A wave spring 108 is illustrated which applies an axial force to the shifting collar 102, maintaining the collar 102 in an axial position such that the internal splines 115 of the shifting collar 102 remain engaged with the external splines 116 of the gear nest 103.

A casing aperture 109 is present, which is defined by the casing 101 and thus may rotate with the casing 101. The casing aperture 109 may be a relatively small window, such that the casing 101 maintains a level of lubricant within the casing 101. An oil jet (not shown in FIG. 1) may be directed toward the casing 101, such that as the casing aperture 109 passes through as the casing 101 rotates, oil or lubricant is directed to the interior components of the differential 100, e.g., the side gears 106, the spindle 104, differential gears 105, etc. Any shape or configuration of the casing aperture 109 may be employed that is convenient. Merely by way of example, the aperture 109 may form a generally cylindrical through-hole that extends from outside the casing 101 to an internal region of the differential 100, e.g., including the side gears 106, the differential gears 105, the spindle 104, and the gear nest 103.

Turning now to FIG. 2A, the differential 100 is illustrated in a disconnected state, i.e., where the casing 101 and output gear 101' may be slowed or stopped, while the side gears 106 and axle shafts 107 are permitted to rotate, e.g., due to rotation of their associated wheels (not shown). In this state, the side gears 106 may be driven by the rotation of axle shafts 107, but the casing 101 may remain stationary with respect to the differential assembly 100. More specifically, the external spline 118 of the half shafts 107 turns the internal splines 117 of the side gears 106. The side gears 106 turn the differential gears 105, causing rotation of the spindle 104 and the gear nest 103. However, the gear nest 103 is disengaged from the casing 101, as the disconnect device 135 has been adjusted such that the differential 100 is disconnected. In the example illustrated, the shifting collar 102 has been laterally displaced (against the force of the wave spring 108) such that the internal splines 115 of the shifting collar 102 have been disengaged from the external splines 116 of the gear nest 103. As a result, the gear nest 103 rotates within the casing 101, and torque is not transmitted from the gear nest 103 to the collar 102 (or to the casing 101, or to the output gear 101'). Accordingly, the motor (not shown) associated with the differential 100 may be deactivated or stopped, e.g., to reduce consumption of electrical power. The motor (not shown) may, in this disconnected state, still turn the casing 101 to bring the casing aperture 109 into alignment with an oil jet 110. In one example, a sensor 111 detects that a radial locator 112 is positioned such that the casing aperture 109 is aligned with the oil jet 110. The sensor 111 may determine a rotational position of the casing 101 and/or output gear 101' based upon a proximity of the locator 112 to the sensor 111. For example, the sensor 111 may be an incremental encoder configured to read the locator 112 to determine a rotational position of the casing 101 and/or aperture 109. In another example, the sensor 111 is a Hall effect sensor configured to determine the position of the casing 101 and/or aperture 109 based upon a presence or absence of a magnetic field of the locator 112. In some examples, position of the casing 101 and/or the aperture 109 may be monitored or sensed via a connected rotating component having a rotational position that can be expressed as a function of a position of the casing 101 or output gear 101'. Merely as one example, an electric motor (not shown) supplying torque to the output gear 101'/casing 101 may measure angular position of an output or rotor of the motor using a resolver. As the output gear 101'/casing 101 has a rotational relationship with the motor, e.g., via gear(s) driven by the motor, which in turn drive the output gear 101'/casing 101, an angular position of the casing 101 and/or aperture 109 may be determined based upon the known rotational position of the rotor of the motor. Accordingly, the casing 101 may be positioned rotationally such that the casing 101 does not obstruct the oil jet 110, which may freely direct lubricant to the moving components of the differential 100, e.g., the ends of the axle shafts 107, the side gears 106, the differential gears 105, spindle 104, and the gear nest 103.

Figure 2B:
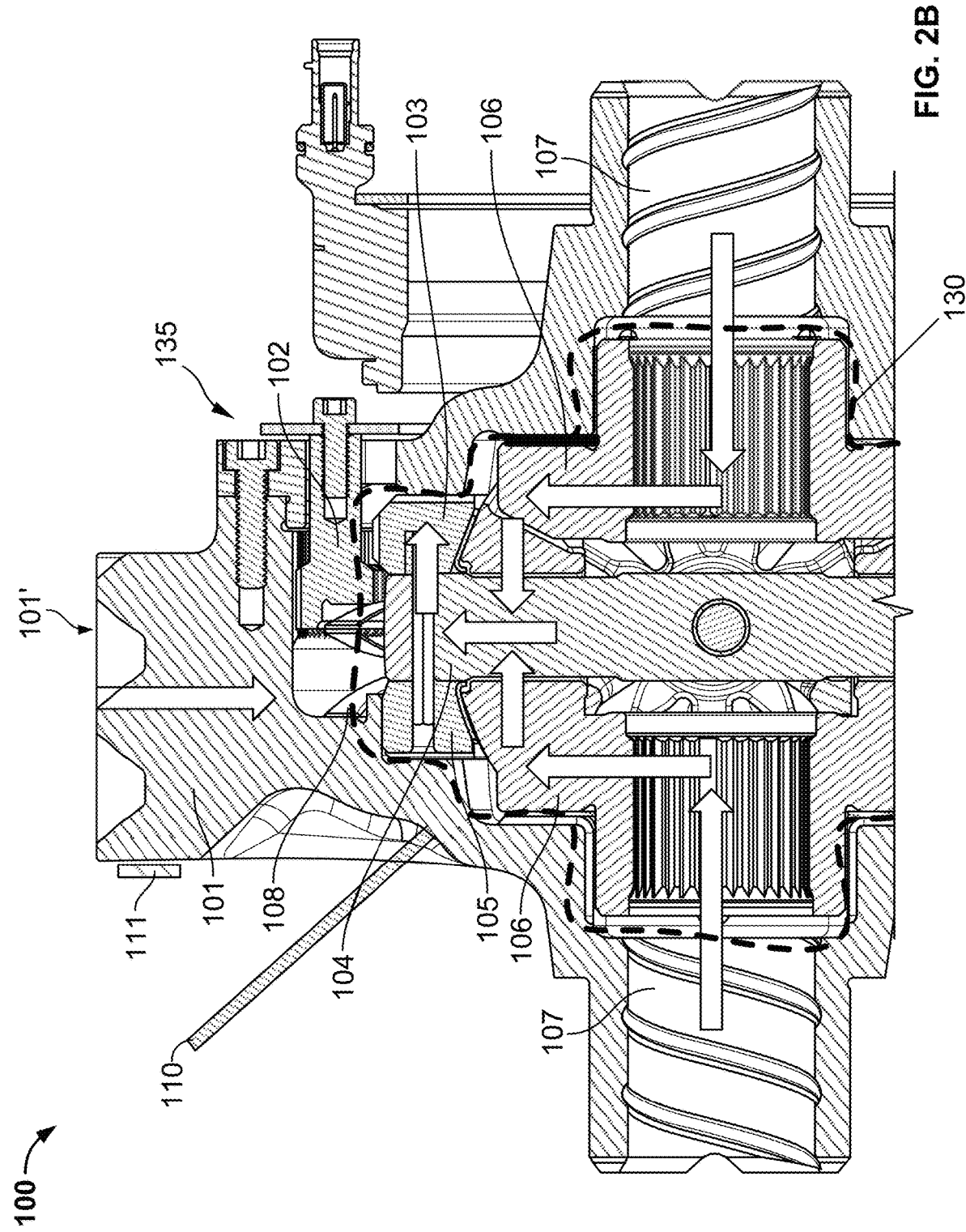
FIG. 2B shows a cutaway view of the disconnecting differential of FIGS. 1 and 2A in the disconnected state, with the casing rotated such that the aperture in the casing is misaligned with the oil jet, in accordance with some embodiments of the present disclosure.

Referring now to FIG. 2B, the differential 100 is again illustrated in the disconnected state as with FIG. 2A. However, in FIG. 2B the casing 101 is relatively rotated such that the casing aperture 109 (not shown in FIG. 2B) is not aligned with the oil jet 110. As a result, the oil jet 110 is at least partially blocked with respect to directing lubrication to the internal components of the differential assembly 100, e.g., the ends of the axle shafts 107, the side gears 106, the differential gears 105, spindle 104, and the gear nest 103. As will be discussed further below, in some example approaches the misalignment of the casing aperture 109 with the oil jet 110 may be detected, e.g., based upon the position sensor 111, and the motor may be used to drive the output gear 101' and/or casing 101 to bring the casing aperture 109 back into alignment with the oil jet 110 (e.g., as illustrated in FIG. 2A).

Figure 3:
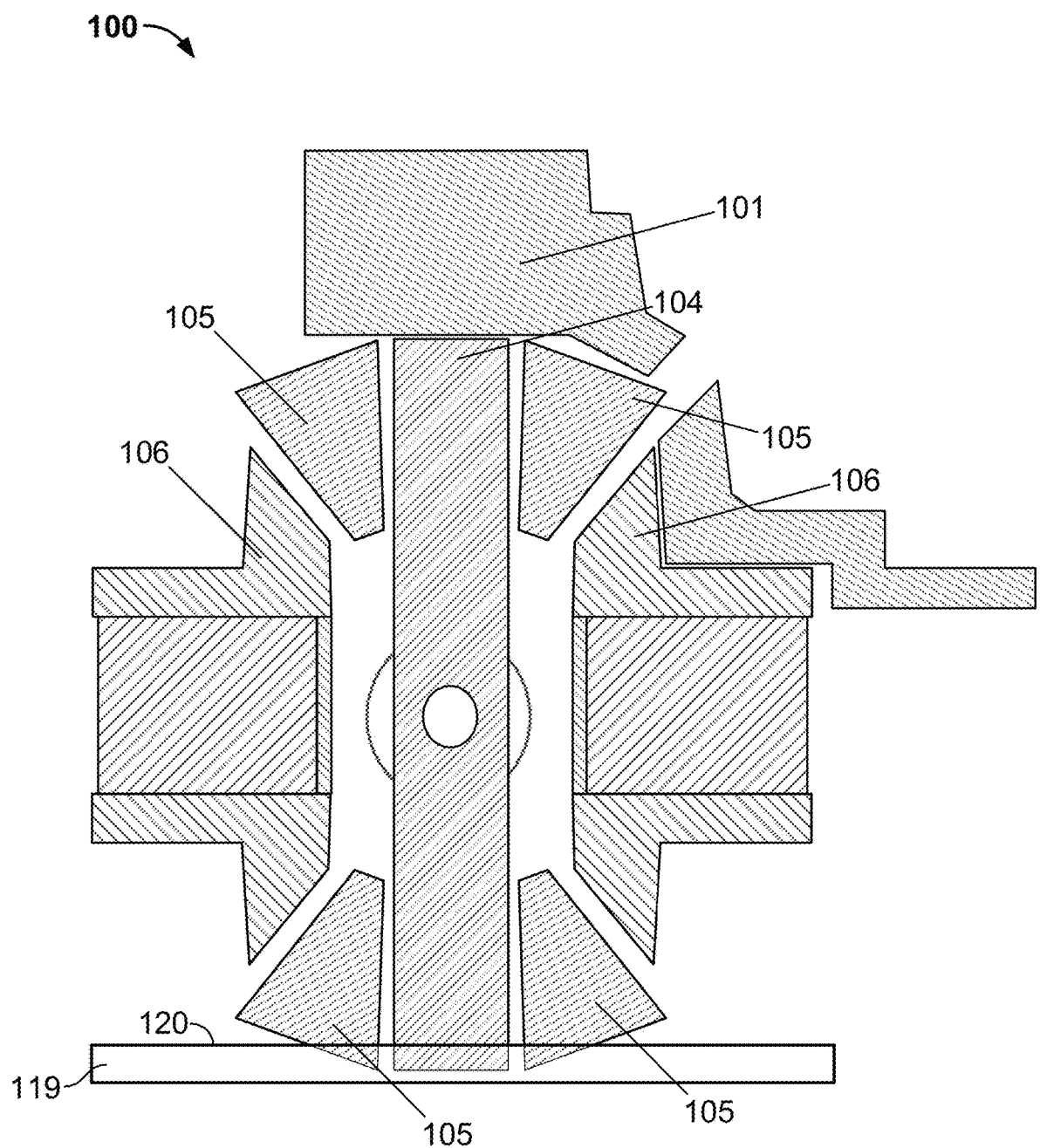
FIG. 3 shows a section view of an illustrative disconnecting differential, in accordance with some embodiments of the present disclosure.

Turning now to FIG. 3, the differential 100 is illustrated with the spindle 104, differential gears 105, and side gears 106 each positioned within casing 101. As illustrated, in some examples a lower edge of each differential gear 105 is positioned such that it rotates through a volume of lubricant 119 having an upper surface 120. However, any other lubrication level may be employed that is convenient. In contrast to previous approaches, the amount of lubricant 119 required for example illustrations herein is relatively reduced, with the upper surface 120 positioned relatively lower within the differential 100 compared to these previous approaches, thereby reducing frictional losses of the differential 100 during a disconnected state of the differential. Moreover, moving internal components of the differential 100 may still receive sufficient lubrication due to the enhanced circulation of lubricant by way of the oil jet 110 through the casing aperture 109 (see FIG. 2A).

As mentioned above regarding each of the example approaches described herein, lower lubrication levels/ amounts in a differential may be employed as a result of the enhanced circulation of lubrication to moving differential components. Example differential assemblies may therefore achieve reductions in frictional losses compared with previous approaches. While reductions in frictional losses will vary based upon operating factors and conditions such as oil type, viscosity, operating temperatures, gear size(s), and/or operating speed, example approaches are estimated to achieve a power loss reduction of three percent (3%).

Figure 4:
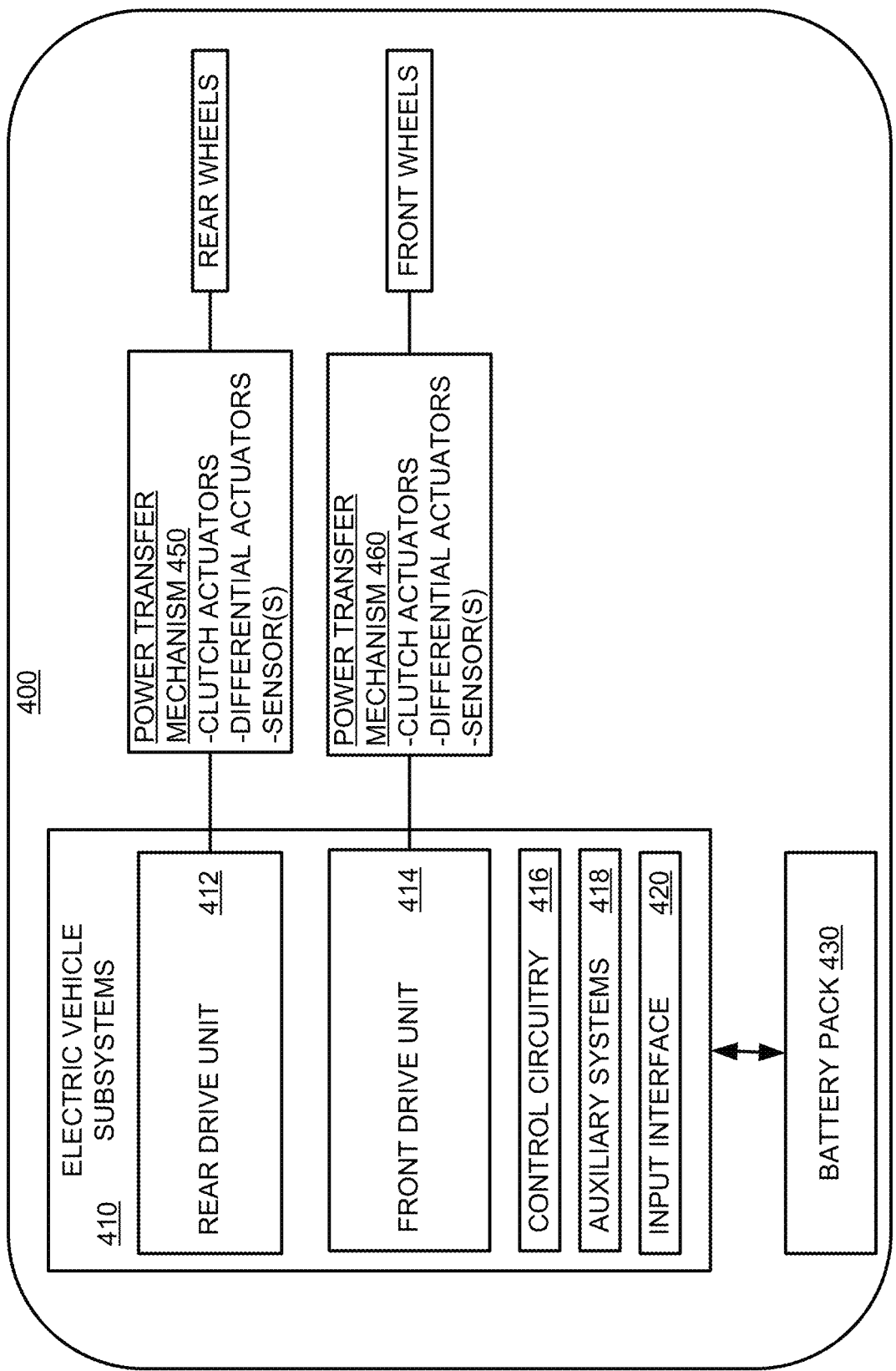
FIG. 4 shows a schematic view of an illustrative vehicle having a disconnecting differential, in accordance with some embodiments of the present disclosure.

FIG. 4 shows a block diagram of illustrative electric vehicle 400 having a control system for controlling one or more drive units and differential assemblies 100, in accordance with some embodiments of the present disclosure. While examples herein are described in the context of the electric vehicle 400, it should be understood that the various example illustrations herein may be employed in any other type of vehicle without limitation. Merely as examples, in other examples the vehicle 400 may be powered exclusively by an internal-combustion (IC) engine vehicle, or may have a hybrid powertrain including one or more electric motors in addition to an IC engine. Electric vehicle 400 includes battery pack 430, electric vehicle subsystems 410, suspension, and wheels. Electrical vehicle subsystems 410 includes, for example, rear drive unit 412, front drive unit 414, control circuitry 416, auxiliary systems 418, input interface 420, and any other suitable corresponding equipment. Electric vehicle 400 includes power transfer mechanism 450 (e.g., a gearbox, pulley system, or other mechanism for transferring shaft work including a differential assembly 100) corresponding to one drive axis (e.g., rear drive axis) and power transfer mechanism 460 corresponding to another drive axis (e.g., front drive axis). Vehicle 400 may include differential assembly 100 of FIGS. 1, 2A, 2B, and 3 as part of either or both of power transfer mechanisms 450 and 460. Vehicle subsystems 410 may be used to, for example, monitor operation (e.g., sensor signals) of vehicle 400, control actuators (e.g., differential actuators or oil jet actuators) of any of the illustrative arrangements and drive systems of FIG. 1-3, or otherwise manage operation of vehicle 400. To illustrate, each of power transfer mechanisms 450 and 460 may include a differential 100 and vehicle subsystems 410 can be used to control the connected/disconnected state of each differential 100, control the rotational position of each casing 101 to align a respective oil jet 110 with a respective casing aperture 109 in the disconnected state, and control each oil jet 110 to provide lubrication through a respective aperture 109 to a respective internal region 130 of the differential assembly 100.

In some embodiments, control circuitry 416 may include processing equipment, memory, power management components, any other suitable components for controlling one or more drive unit (e.g., front drive unit 414 and rear drive unit 412), or any combination thereof. For example, control circuitry 416 may control current flow (e.g., amount of current and current direction) to phases of an electric motor of one or more drive units (e.g., using electric power as stored in battery pack 430. In a further example, control circuitry 416 may control differential operation (e.g., using an electromagnetically-actuated differential) in a single or dual drive unit. In some embodiments, control circuitry 416 is configured to actuate and de-actuate a differential actuator. For example, control circuitry may provide control signals (e.g., communications, electric power, or both) to (i) one or more differential actuators of power transfer mechanism 450, 460, or both, or (ii) one or more oil jet actuators of power transfer mechanisms 450, 460, or both, or (iii) a combination thereof. In a further example, the control signals may be binary (e.g., on/off application of a DC voltage), analog (e.g., the control signal may be proportional based on a voltage range, pulse-width modulation, or pulse-density modulation), oscillatory (e.g., and AC signal or other oscillating signal), any other suitable waveform or shape (e.g., square wave, sawtooth wave, triangular wave, rectified sinusoidal wave), or any combination thereof. In some embodiments, actuators are spring-loaded or otherwise biased in an engaged or disengaged state, and application of electrical power, hydraulic power, or pneumatic power from vehicle subsystem 410 causes a change in state (e.g., engaged to disengaged, or disengaged to engaged).

In some embodiments, control circuitry 416 may include one or more sensors, one or more sensor interfaces (e.g., for sensors that are included as part of a drive unit), corresponding wiring, corresponding signal conditioning components, any other suitable components for sensing a state of a drive unit, or any combination thereof. For example, as illustrated in the example in FIG. 4, control circuitry 416 may include sensor interface(s) for communicating with position sensor(s) included in the power transfer mechanism 450 and/or 460 (e.g., for each differential casing). The sensor(s) of the power transfer mechanisms 450, 460 may be a position sensor, although in some examples a speed sensor (e.g., a rotary encoder), a current sensor, a voltage sensor, a temperature sensor, any other suitable sensor, or any combination thereof may be provided. In some embodiments, control circuitry 416 may be implemented by a central controller, a plurality of distributed control systems, an embedded system, or any combination thereof. For example, control circuitry 416 may be at least partially implemented by an electronic control unit (ECU). In a further example, the electric vehicle may include a power electronics system that is controlled by the ECU and is configured to manage current to one or more electric motors of one or more drive units. Rear drive unit 412 may be coupled to wheels of the electric vehicle by a half shaft, a constant-velocity joint, one or more suspension/steering components, any other suitable coupling, or any suitable combination thereof. Front drive unit 414 may be coupled to wheels of the electric vehicle by a half shaft, a constant-velocity joint, one or more suspension/steering components, any other suitable coupling, or any suitable combination thereof. For example, a wheel may be mounted to a hub that is includes a bearing for a half-shaft, wherein the hub is coupled to suspension/steering components that are mounted to the vehicle frame (e.g., wherein the drive units are also mounted to the vehicle frame).

In some embodiments, a drive system may include a first drive unit and optionally a second drive unit, each including a differential assembly. In some embodiments, a drive system, in addition to including a drive unit (e.g., single or dual), may include processing equipment configured to manage motor operation, manage regeneration (e.g., using the motor as a generator), perform any other control function, or any combination thereof. In some embodiments, the drive unit may include at least one sensor (e.g., coupled to a sensor interface of control circuitry) configured to sense wheel slippage and the control circuitry may be further configured to receive a signal from the at least one sensor, detect that wheel slippage is occurring, and activate a differential assembly in response to detecting that wheel slippage is occurring. For example, a sensor may detect shaft speed (e.g., an output shaft speed, as measured by an encoder) or output torque (e.g., an output shaft torque, or a motor torque). In some embodiments, the drive system may include an accelerator pedal configured to indicate a desired speed (e.g., by being depressed by a user), and the processing equipment may receive a signal from the accelerator pedal, determine a speed parameter based on the signal, and activate one or more differential assemblies, one or more motors, or a combination thereof, if the speed parameter is above a threshold. For example, if a user "floors" the accelerator pedal (e.g., more than 50% demand), the control circuitry may activate one or more differential assemblies to provide torque from one or more motors to the wheels. In some embodiments, the control circuitry may activate and deactivate a differential assembly based on road conditions (e.g., icy roads, puddles, high winds), a drive mode (e.g., an off-road mode, a sport mode, or a traction mode), any other suitable criterion, or any combination thereof.

Figure 5:
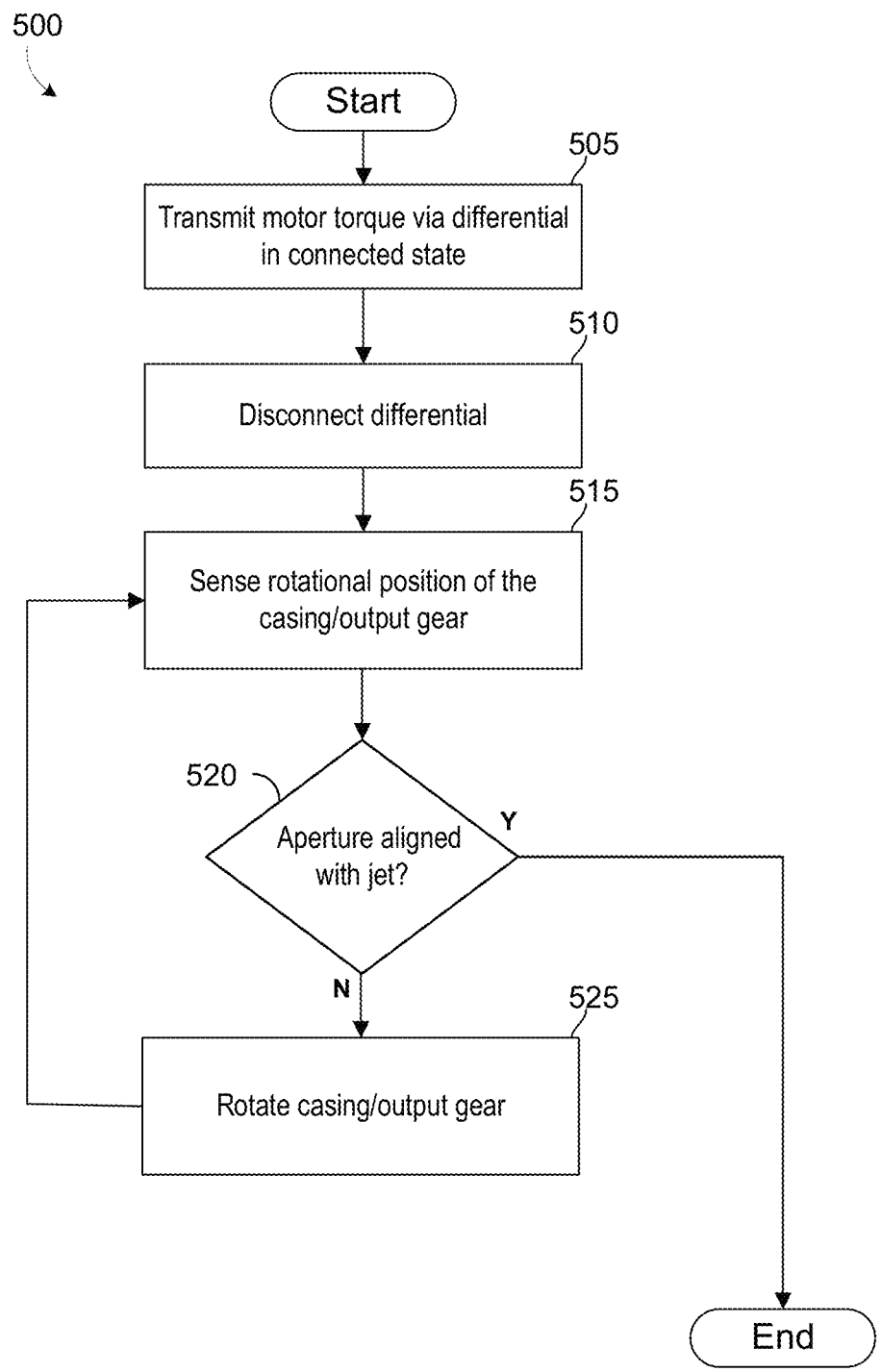
FIG. 5 shows a flowchart of an illustrative process of lubricating a differential, in accordance with some embodiments of the present disclosure.

Turning now to FIG. 5, an example process 500 is illustrated for operating a differential, e.g., in a motor vehicle such as an electric vehicle. At block 505, process 500 may operate the differential in a connected state. For example, as noted above torque received from a motor may be transmitted via a differential casing 101 to a pair of axle shafts 107, the axle shafts each having associated wheels. Additionally, the differential casing may at least partially define a lubrication enclosure, e.g., enclosure 130, configured to generally contain an amount of lubrication. Further, torque may be transmitted from the differential casing to the axle shafts 107 via one or more moving internal components disposed within the lubrication enclosure, with each of the side gears configured to receive the torque from the casing while permitting a differential speed between the side gears. Process 500 may then proceed to block 510.

At block 510, process 500 may disconnect the side gears from the casing via a disconnect device, such that the differential is in a disconnected state. For example, as described above in FIG. 2B, shifting the collar 102 allows the casing 101 to not be turned or driven by the two side gears 106, while the side gears 106 are rotated by their respective vehicle wheel.

Proceeding to block 515, process 500 may sense a rotational position of the casing. For example, a position sensor 111 having a fixed position on the casing 101 may be used to determine a radial location of a radial marker 112 on the casing 101. The radial marker 112 may indicate an alignment of casing aperture 109 with oil jet 110, for example. In another example, a position of a rotor of an electric motor driving the casing 101 may be related to rotational position of the casing, and thus the position of the casing aperture 109 may be determined from sensor(s) of the rotor/motor.

Proceeding to block 520, process 500 may query whether the casing and/or output gear is positioned such that the casing aperture 109 is aligned with oil jet 110, e.g., based upon the sensed position at block 515. Where process 500 determines that the casing aperture 109 is not aligned with the oil jet 110, process 500 may proceed to block 525. At block 525, while the differential 100 is in the disconnected state, the casing 101 may be rotated on the basis of the position sensed at block 515. For example, a controller or processor (e.g., control circuitry 416 of FIG. 4) may be configured to determine, e.g., based upon the position sensed at block 515, whether a casing aperture 109 is aligned with an oil jet 110. Alternatively or in addition, the controller may determine a distance the casing/output gear should be rotated to align the casing aperture 109 with the oil jet 110. In an example, the controller may have a processor and a memory in communication with the processor. The memory may include a computer-readable storage medium tangibly embodying instructions, which may cause the controller to implement various processes or steps thereof described herein.

Accordingly, where process 500 determines that it is necessary to rotate the casing 101 and/or output gear 101' to improve lubrication of the differential, the casing 101/output gear 101' may be rotated while the differential 100 is in the disconnected state. In an example, the controller/control circuitry 416 is configured to rotate the casing 101 and/or output gear 101' when the differential is in the disconnected state in response to the determined rotational position of the casing 101 and/or output gear 101'. For example, the controller/control circuitry 416 may drive the motor to turn the casing 101, bringing the casing aperture 109 into alignment with the oil jet 110 that is configured to provide lubrication to the moving internal components via the casing aperture 109. Accordingly, the oil jet 110 is generally not obstructed by the casing 101 when the casing aperture 109 is aligned with the oil jet 110. Lubrication may therefore be efficiently delivered to the moving internal components, reducing the amount of lubrication needed within the casing 101.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A disconnecting differential, comprising:
   two side gears configured to deliver torque from a differential casing to respective vehicle wheels when the differential is in a connected state, each of the side gears configured to receive the torque from an output gear while permitting a differential speed between the side gears;
   a disconnect device configured to disconnect the differential casing from the two side gears such that the differential is in a disconnected state; and
   a position sensor configured to determine a rotational position of the differential casing.

2. The disconnecting differential of claim 1, wherein the differential casing is configured to be rotated while the differential is in the disconnected state.

3. The disconnecting differential of claim 2, wherein the differential casing is configured to be rotated while the differential is in the disconnected state in response to the determined rotational position of the differential casing.

4. The disconnecting differential of claim 3, wherein the differential casing includes a casing aperture configured to be aligned with an oil jet configured to provide lubrication to moving internal components of the differential via the casing aperture, wherein the oil jet is not obstructed by the differential casing when the casing aperture is aligned with the oil jet.

5. The disconnecting differential of claim 3, wherein the differential casing includes a casing aperture configured to permit lubrication of moving internal components of the differential by an oil jet, wherein the differential casing is configured to be rotated in response to a determination that the casing aperture is misaligned with the oil jet.

6. The disconnecting differential of claim 1, further comprising a marker secured to the differential casing, wherein the position sensor is configured to determine the rotational position of the differential casing based upon a proximity of the marker to the position sensor.

7. The disconnecting differential of claim 1, wherein the differential casing comprises a lubrication aperture configured to allow an oil jet to deliver a lubricant to an internal region of the disconnecting differential.

8. The disconnecting differential of claim 1, wherein the disconnect device includes a shifting collar configured to engage an external spline of a gear nest with an internal spline of the shifting collar when the disconnecting differential is in the connected state, and wherein the differential further comprising a spring biasing the shifting collar toward an engaged position, wherein the disconnecting differential is in the connected state.

9. The disconnecting differential of claim 1, further comprising a controller in communication with the position sensor.

10. A vehicle, comprising:
a disconnecting differential having two side gears configured to deliver torque from a differential casing to respective vehicle wheels when the differential is in a connected state, each of the side gears configured to receive the torque from the differential casing while permitting a differential speed between the side gears;
a disconnect device configured to disconnect the differential casing from the two side gears such that the differential is in a disconnected state; and
a position sensor configured to determine a rotational position of the differential casing.

11. The vehicle of claim 10, further comprising a controller in communication with the position sensor, wherein the controller is configured to rotate the differential casing when the differential is in the disconnected state in response to the determined rotational position of the differential casing.

12. A method, including:
operating a differential in a connected state, wherein torque received from a motor is transmitted via a differential casing to a pair of axle shafts, the differential casing at least partially defining a lubrication enclosure, wherein the torque is transmitted from the differential casing to the axle shafts via two side gears configured to receive the torque from the differential casing while permitting a differential speed between the side gears;
disconnecting the side gears from the differential casing via a disconnect device such that the differential is in a disconnected state, wherein the differential casing is not driven by the two side gears while the side gears are rotated by their respective vehicle wheel; and
sensing a rotational position of the differential casing using a position sensor.

13. The method of claim 12, further comprising rotating the differential casing while the differential is in the disconnected state.

14. The method of claim 13, wherein the differential casing is rotated while the differential is in the disconnected state in response to the sensed rotational position of the differential casing.

15. The method of claim 14, further comprising aligning a casing aperture with an oil jet configured to provide lubrication to moving internal components via the casing aperture.

16. The method of claim 15, wherein the oil jet is not obstructed by the differential casing when the casing aperture is aligned with the oil jet.

17. The method of claim 13, further comprising determining that a casing aperture defined by the differential casing is misaligned with an oil jet configured to provide lubrication to moving internal components through the casing aperture, wherein the differential casing is rotated in response to a determination that the casing aperture is misaligned with the oil jet.

18. The method of claim 12, wherein the rotational position of the differential casing is determined via a marker secured to the differential casing.

19. The method of claim 18, wherein the rotational position of the differential casing is determined based on a proximity of the marker to the position sensor.

20. The method of claim 12, wherein the differential casing at least partially encloses the two side gears.

* * * * *